United States Patent [19]

Uchiyama et al.

[11] Patent Number: 4,861,656
[45] Date of Patent: Aug. 29, 1989

[54] OPTICAL RECORDING MEDIUM

[75] Inventors: Kenji Uchiyama; Hideki Ishizaki; Suguru Takayama, all of Nagano, Japan

[73] Assignee: TDK Corporation, Tokyo, Japan

[21] Appl. No.: 136,973

[22] Filed: Dec. 23, 1987

[30] Foreign Application Priority Data

Dec. 24, 1986 [JP] Japan .................. 61-313615
Dec. 25, 1986 [JP] Japan .................. 61-314949

[51] Int. Cl.$^4$ .............................. G11B 5/66
[52] U.S. Cl. ...................... 428/333; 428/694; 428/698; 428/713; 428/900; 428/695; 360/135; 365/122

[58] Field of Search ........... 430/945; 346/76 L, 135.1; 369/288; 428/64, 65, 131, 698, 695, 913, 332, 333, 694, 900; 360/135; 365/122

[56] References Cited

U.S. PATENT DOCUMENTS 4,569,881 2/1986 Freese et al. .................. 428/213

Primary Examiner—Ellis P. Robinson
Assistant Examiner—P. J. Ryan
Attorney, Agent, or Firm—Oblon, Spivak, McClelland, Maier & Neustadt

[57] ABSTRACT

An optical recording medium comprising a recording layer on a substrate is more durable when an intermediate layer of a composition comprising a rare earth element oxide, silicon oxide, and silicon nitride is formed between the substrate and the recording layer.

12 Claims, 1 Drawing Sheet

OPTICAL RECORDING MEDIUM

BACKGROUND OF THE INVENTION

This invention relates to optical recording media.

For optical recording media of magneto-optical memory type, there are well known a number of materials for a recording layer thereof, for example, MnBi, MnAlGe, MnSb, MnCuBi, GdFe, TbFe, GdCo, PtCo, TbCo, TbFeCo, GdFeCo, TbFeO$_3$, GdIG (gadolinium iron garnet), GdTbFe, GdTbFeCoBi, CoFe$_2$O$_4$, etc. These materials are deposited on transparent substrates of plastic material or glass as a thin film by any suitable thin-film forming techniques such as vacuum deposition or sputtering. The features common to these magneto-optical recording thin film layers are that the axis of easy magnetization is perpendicular to the film surface and that Kerr and Farady effects are great.

Requirements imposed on such magneto-optical recording media are:

(1) that the Curie point is of the order of 100° to 200° C. and the compensation point is close to room temperature, (2) that noise-inducing defects such as grain boundaries are relatively fewer, and (3) that a magnetically and mechanically uniform film is obtained over a relatively large area.

In the light of these requirements, a great attention is recently drawn to amorphous perpendicular magnetizable thin films of rare earth element-transition metal among the above-mentioned materials. Magneto-optical recording media having such amorphous perpendicular magnetizable thin films of rare earth element-transition metal, however, have a storage problem. If the magnetic thin film layers are stored in contact with the ambient atmosphere, rare earth elements therein are preferentially eroded or oxidized by oxygen and moisture in the atmosphere, losing the necessary information recording and reproducing ability. The rotational angle available upon reading of recorded signals should be as large as possible in order to improve the S/N ratio.

For this reason, most investigations are generally directed to those recording media of the construction having an intermediate layer disposed on a surface of a magnetic thin film layer adjacent to or remote from the substrate. The intermediate layer is provided for the purpose of imparting corrosion resistance or moisture proofness and adding a multiple interference effect or Farady effect to Kerr effect to increase the rotational angle. Known intermediate layers are vacuum deposited films of inorganic materials such as silicon monoxide, silicon dioxide, aluminum nitride, silicon nitride and zinc sulfide as well as resinous coatings (see Japanese Patent Application Kokai Nos. 58-80142 and 59-52443). However, these layers are insufficient in corrosion resistance or the like.

It is also known to form an intermediate layer from a mixture of oxide and nitride. For example, Japanese Patent Application Kokai No. 60-145525 discloses a mixture of Si$_3$N$_4$ and SiO$_2$, Si$_3$N$_4$ and SiO, or AlN and Al$_2$O$_3$.

These intermediate layers, however, are not satisfactory with respect to corrosion resistance, C/N (carrier-to-noise ratio), delamination, cracking, initial deformation of the medium like warpage, and film forming speed. There is a need for an optical recording medium having more improved properties.

The same problem arises in an optical recording medium having a recording layer of the so-called phase conversion type.

SUMMARY OF THE INVENTION

One object of the present invention is to provide a novel and improved optical recording medium having improved durability, corrosion resistance, and C/N ratio.

Another object of the present invention is to provide a novel and improved optical recording medium having a recording layer which is unlikely to deteriorate.

A further object is to provide an optical recording medium wherein delamination, cracking and initial warpage are minimized.

A still further object is to provide an optical recording medium of the type wherein information is recorded and reproduced with the use of heat and light of a laser beam.

The present invention is directed to an optical recording medium comprising a substrate, a recording layer on the substrate, and an intermediate layer formed between the substrate and the recording layer. According to the feature of the present invention, the intermediate layer comprises a mixture of at least one rare earth element oxide, preferably the oxide of La and/or Ce, silicon oxide, and silicon nitride.

In one preferred embodiment, a protective layer is disposed between the substrate and the intermediate layer and/or on the recording layer.

BRIEF DESCRIPTION OF THE DRAWINGS

The above and other objects, features, and advantages of the present invention will be more readily understood from the following description when taken in conjunction with the accompanying drawings, in which.

DETAILED DESCRIPTION OF THE INVENTION

Figure 1:
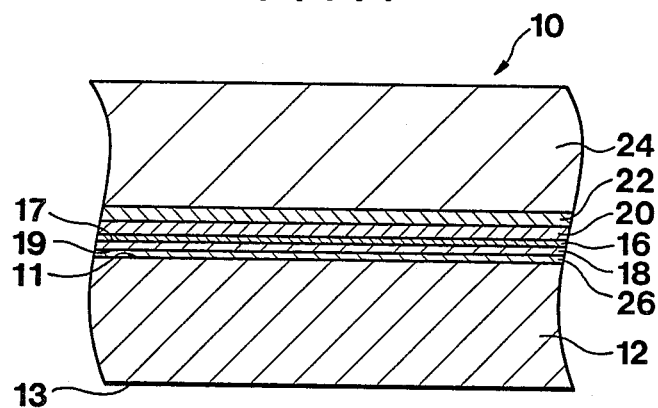
FIG. 1 is a cross-sectional view of an optical recording medium according to one embodiment of the present invention.
Figure 2:
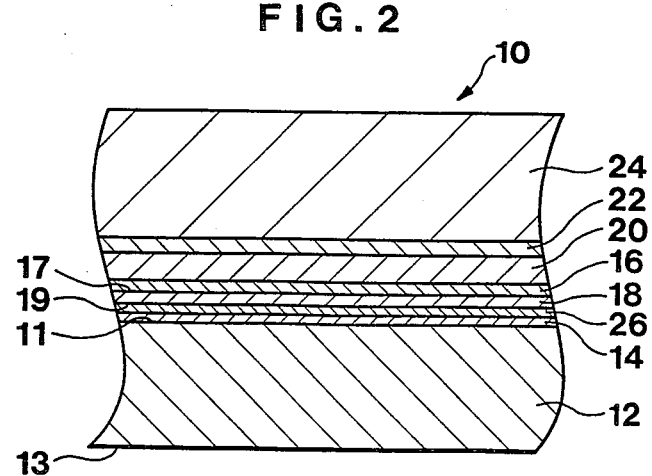
FIG. 2 is a cross-sectional view of an optical recording medium according to another embodiment of the present invention.

Two preferred embodiments of the optical recording medium of the present invention are illustrated in FIGS. 1 and 2. They have substantially the same structure except for the presence of a lower protective layer in FIG. 2. Like reference numerals designate identical or corresponding parts throughout the figures. For brevity of description, the terms "upper" and "lower" are used in a normal sense as viewed in FIGS. 1 and 2.

The optical recording medium according to the present invention is generally designated at 10 as comprising a substrate 12 having a pair of opposed major surfaces 11, 13 and an intermediate layer 26 on the upper surface 11 of the substrate. A recording layer in the form of a magnetic thin-film layer 18 is on the intermediate layer 26. The magnetic thin-film layer 18 has a pair of opposed major surfaces, that is, an upper surface 17 disposed remote from the substrate 12 and a lower surface 19 disposed adjacent to the substrate 12. If desired, the medium may further include a protective layer 16 of vitreous material formed adjacent to the upper surface 17 of the magnetic thin-film layer 18 as shown in FIG. 1. It is also possible that a lower protective layer 14 of vitreous material be disposed between the substrate 12 and the magnetic thin-film layer 18, and an upper protective layer 16 of vitreous material be disposed on the upper surface 17 of the magnetic thin-film layer 18 as shown in FIG. 2.

According to the present invention, the intermediate layer 26 is of a composition comprising the oxide of at least one rare earth element, silicon oxide, and silicon nitride.

The rare earth element used herein includes all the elements chemically classified as rare earth elements, that is, Sc, Y, La through Sm, and Eu through Lu. At least one rare earth element is contained in the intermediate layer composition. Inclusion of lanthanum (La), cerium (Ce) or a mixture of La and Ce is preferred. The oxides of lanthanum and cerium are usually $La_2O_3$ and $CeO_2$. They usually take their stoichiometric composition, but may have a composition deviating therefrom. It suffices that either lanthanum oxide or cerium oxide or both lanthanum oxide and cerium oxide be present in the intermediate layer. When a mixture of lanthanum oxide and cerium oxide is present, the relative proportion is not critical.

In addition to a primary rare earth element oxide selected from lanthanum oxide or cerium oxide or a mixture of lanthanum oxide and cerium oxide, the intermediate layer composition may contain less than about 10 atom % of the oxide of a secondary rare earth element such as Y and Er, the atom % being calculated as metal and based on the primary rare earth element.

The intermediate layer composition may contain the oxides of other incidental elements such as Fe, Mg, Ca, Sr, Ba, and Al. For these incidental elements, Fe is present in an amount of less than about 10 at % and the remaining elements are present in a total amount of less than about 10 at %.

The intermediate layer composition contains silicon oxide and silicon nitride in addition to the rare earth element oxide. Usually, silicon oxide is present in the form of $SiO_2$ and SiO while silicon nitride is present in the form of $Si_3N_4$. They may have a composition deviating from their stoichiometry. Preferably, the silicon oxide and silicon nitride are present at a molar ratio of from about 50:50 to about 90:10 calculated as $SiO_2$ and $Si_3N_4$, respectively. The intermediate layer is generally in amorphous state.

The intermediate layer 26 has a refractive index of from about 1.8 to about 3.0, preferably from about 2.0 to about 2.5 at a wavelength of 800 nm. A layer with a refractive index of less than about 1.8 is insufficient in amplifying Kerr rotational angle to increase an output level. A refractive index of more than about 3.0 results in an output drop and a noise increase.

The intermediate layer 26 preferably contains a rare earth element oxide and silicon compounds (oxide and nitride) such that the weight ratio of the total of rare earth element oxide to the total of silicon compounds and rare earth element oxide ranges from about 1:20 to about 1:2. Below this range, there are observable an output drop and a reduction of durability under high-temperature, high-humidity conditions. Beyond this range, there are observable a noise increase and a reduction of durability under high-temperature, high-humidity conditions.

In the intermediate layer, the atomic ratio of O/N preferably ranges from about 0.2:1 to about 3:1. The medium is less durable under high-temperature, high-humidity conditions when the intermediate layer has an O/N atomic ratio of less than 0.2. The medium produces an output drop and tends to deteriorate with time when the intermediate layer has an O/N atomic ratio of more than 3. It will be understood that determination of such an atomic ratio can be made by a suitable spectral analysis such as Auger spectroscopy and EDA.

The intermediate layer may have a graded concentration of oxygen and nitrogen in its thickness direction. It is preferred that the intermediate layer is oxygen rich on a side adjacent to the substrate and nitrogen rich on a side remote from the substrate. More specifically, the intermediate layer has an atomic ratio $(O/N)_l$ of from about 1.0 to about 100 near its lower surface adjacent to the substrate, and an atomic ratio $(O/N)_u$ of from about 0.1 to about 2.0 near its upper surface remote from the substrate, with the ratio of $(O/N)_l/(O/N)_u$ ranging from about 1 to about 100.

Another concentration gradient is also contemplated wherein both nitrogen and oxygen become rich on a side adjacent to the substrate.

In combination with the intermediate layer 26, such an intermediate layer composition as mentioned above may be deposited on the magnetic thin-film layer 18 to form a protective layer 16. In this embodiment, the intermediate and protective layers 26 and 16 may have the same composition or different compositions falling within the specific composition of the present invention.

It is desired to form the intermediate layer 26 by sputtering. The preferred target used in sputtering is a sintered mixture of a rare earth element oxide, preferably $La_2O_3$ and/or $CeO_2$, $SiO_2$ and Si The rare earth element oxide, especially $La_2O_3$ and/or $CeO_2$, can be partially or entirely replaced by the oxide of a pyrophoric alloy such as Auer metal, Huber metal, Misch metal, and Welsbach metal. The composition of these pyrophoric alloys is shown in Table 1.

TABLE 1

| Alloy designation | Component, % by weight | | | | | | | | | |
|---|---|---|---|---|---|---|---|---|---|---|
| | Fe | Zn | Ce | La | Y | Er | Mg | Sn | Pb | Cd |
| Auer metal | 35 | — | 35 | 24 | 4 | 2 | — | — | — | — |
| Huber metal | — | — | 85 | — | — | — | 15 | — | — | — |
| Misch metal | — | — | 40–60 | 20–40 | balance | | — | — | — | — |
| Welsbach metal | 30 | — | 70 | — | — | — | — | — | — | — |
| Welsbach metal No. 1 | 30 | — | 60 | balance | | | — | — | — | — |
| Welsbach metal No. 1A | — | — | 57 | — | — | — | 3 | — | — | 40 |
| Welsbach metal No. 2 | — | — | 67 | — | — | — | 3 | 30 | — | — |
| Welsbach metal No. 3 | — | 30 | 67 | — | — | — | 3 | — | — | — |

TABLE 1-continued

| Alloy designation | Component, % by weight | | | | | | | | | |
|---|---|---|---|---|---|---|---|---|---|---|
| | Fe | Zn | Ce | La | Y | Er | Mg | Sn | Pb | Cd |
| No. 4 | — | — | 67 | — | — | — | 3 | — | 30 | — |

Any other suitable gas phase film-forming technique may be chosen, for example, chemical vapor deposition (CVD), evaporation, and ion plating.

The intermediate layer may contain impurities such as argon and nitrogen which are introduced from the film-forming atmosphere. In addition, such elements as Fe, Ni, Cr, Cu, Mn, Mg, Ca, Na, and K can be present as impurities.

The intermediate layer 26 has a thickness of from about 300 to about 3,000Å, preferably from about 500 to about 2,000Å. A thickness of less than 300Å results in a reduced output and poor weatherability. Sensitivity and productivity are reduced with a thickness in excess of 3,000Å.

In the preferred embodiment of the present invention, the protective layer 14 is formed between the substrate 12 and the intermediate layer 26. That is, the protective layer 14 is on the upper surface 11 of the substrate 12.

Any desired material can form the protective layer 14 as long as it is of vitreous nature. Preferred materials are described below.

(I) A first vitreous material consists essentially of silicon oxide, an alkali metal oxide, and aluminum oxide or boron oxide. Preferably, the content of silicon oxide ranges from about 40 to about 60% by weight and the content of alkali metal oxide ranges from about 0.5 to about 10% by weight, more preferably from about 1.0 to about 10% by weight.

(II) A second vitreous material consists essentially of silicon oxide, an alkali metal oxide, aluminum oxide or boron oxide, and a metal oxide represented by M(II)O wherein M(II) is a divalent metal. Preferably, the content of silicon oxide ranges from about 40 to about 60% by weight and the content of alkali metal oxide ranges from about 0.5 to about 10% by weight, more preferably from about 1.0 to about 10% by weight.

(III) A third vitreous material consists essentially of silicon oxide, aluminum oxide or boron oxide, and a metal oxide represented by M(II)O wherein M(II) is a divalent metal. Preferably, the content of silicon oxide ranges from about 40 to about 60% by weight and the content of divalent metal oxide ranges from about 10 to about 50% by weight.

(IV) A fourth vitreous material consists essentially of silicon oxide, an alkali metal oxide, and aluminum oxide and boron oxide. Preferably, the content of silicon oxide ranges from about 40 to about 60% by weight and the content of alkali metal oxide ranges from about 0.5 to about 0% by weight, more preferably from about 1.0 to 10% by weight.

(V) A second vitreous material consists essentially of silicon oxide, an alkali metal oxide, aluminum oxide and boron oxide, and a metal oxide represented by M(II)O wherein M(II) is a divalent metal. Preferably, the content of silicon oxide ranges from about 40 to about 60% by weight and the content of alkali metal oxide ranges from about 0.5 to about 10% by weight, more preferably from about 1.0 to 10% by weight.

(VI) A third vitreous material consists essentially of silicon oxide, aluminum oxide and boron oxide, and a metal oxide represented by M(II)O wherein M(II) is a divalent metal. Preferably, the content of silicon oxide ranges from about 40 to about 60% by weight and the content of divalent metal oxide ranges from about 10 to about 50% by weight.

Outstanding durability is achieved particularly when vitreous materials (I) through (VI), especially (I), (II), (IV), and (V) are used with the contents of certain components falling within the above-defined ranges.

In these vitreous materials (I) through (VI), silicon oxide is usually present in the form of $SiO_2$. The alkali metal oxides include $Li_2O$, $Na_2O$, $K_2O$, $Rb_2O$, $Cs_2O$, and $Fr_2O$, with the lithium oxide, sodium oxide and potassium oxide being preferred. They may be used alone or in admixture of two or more. Boron oxide and aluminum oxide are usually present in the form of $B_2O_3$ and $Al_2O_3$, respectively. The metal oxides M(II)O include BaO, CaO, MgO, ZnO, PbO, SrO, etc., with the barium oxide, calcium oxide and strontium oxide being preferred. They may be used alone or in admixture of two or more.

Most preferred compositions for vitreous materials (I) through (VI) are described below.

In (I), the content of boron oxide or aluminum oxie ranges from about 30 to 59.5% by weight.

In (II) and (III), the content of boron oxide or aluminum oxide ranges from about 30 to 59.5% by weight. The boron or aluminum oxide can be partially or entirely replaced by divalent metal oxide M(II)O such that the content of M(II)O ranges from about 10 to 50%, especially from about 10 to 35% by weight based on the total weight of the layer.

In (IV), the total content of boron oxide and aluminum oxide ranges from 30 to 59.5% by weight. In (IV) to (VI), it is desired that boron oxide is present in an amount of 1.0 to 40% by weight and aluminum oxide is present in an amount of 3.0 to 45% by weight.

In (V), the total content of boron oxide and aluminum oxide ranges from 10 to 49.5% by weight and the content of divalent metal oxide M(II)O ranges from 10 to 49.5% by weight.

In (VI), the total content of boron oxide and aluminum oxide ranges from 10 to 50% by weight.

The protective layer 14 disposed adjacent to the substrate 12 and formed as described above has a thickness of from about 300 to about 1,000Å, more preferably from 400 to 800Å.

Formation of the protective layer 14 can be carried out by a variety of gas phase film-forming techniques as used for the intermediate layer 26.

Instead of or in addition to the protective layer 14 of a vitreous material, another protective layer 16 of a similar material may be formed on a surface of the magnetic thin-film layer 18 remote from the substrate 12 as shown in FIGS. 1 and 2. Like the lower protective layer 14 of vitreous material, the upper protective layer 16 may be formed of any desired vitreous material properly selected from materials (I) through (VI) mentioned above. The lower and upper protective layers 14 and 16 usually have the same composition, but may have different compositions if desired. The upper protective layer 16 of vitreous material may be formed by the same or similar technique as described for the lower protective layer 14. The upper protective layer 16 preferably has a thickness of about 300 to about 3,000Å, more preferably from 500 to 2,000Å.

The magnetic thin-film layer 18 is a layer in which signals indicative of information are magnetically recorded using a modulated thermal beam or modulated magnetic field and the recorded signals are reproduced through magnetic-to-optical signal conversion.

The magnetic thin-film layer is generally formed from alloys containing rare earth elements and transition metals by conventional techniques such as sputtering and vacuum deposition to produce an amorphous film to an ordinary thickness. The rare earth elements and transition metals used include all the members of their chemically defined classes. The preferred rare earth elements are gadolinium (Gd) and terbium (Tb), and the preferred transition metals are iron (Fe) and cobalt (Co). The magnetic thin-film layer is preferably comprised of 65 to 85 atom percents of Fe and Co in total and the balance essentially of rare earth metals, especially Gd and/or Tb. Preferred combinations are TbFeCo, GdFeCo, GdTbFeCo, etc. The magnetic thin-film layer may contain less than about 10 atom % of Cr, Al, Ti, Pt, Si, Mo, Mn, V, Ni, Cu, Zn, Ge, Au, etc. The magnetic thin-film layer may also contain less than about 10 atom % of an additional rare earth element such as Sc, Y, La, Ce, Pr, Nd, Pm, Sm, Eu, Dy, Ho, Er, Tm, Yb, Lu, etc.

The magnetic thin-film layers are preferably 100 to 10,000 Å thick.

The material of which the recording layer is made also includes materials of phase conversion type, for example, Te—Se, Te—Se—Sn, Te—Ge, Te—In, Te—Sn, Te—Ge—Sb—S, Te—Ge—As—Si, Te—Si, Te—Ge—Si—Sb, Te—Ge—Bi, Te—Ge—In—Ga, Te—Si—Bi—Tl, Te—Ge—Bi—In—S, Te—As—Ge—Sb, Te—Ge—Se—S, Te—Ge—Se, Te—As—Ge—Ga, Te—Ge—S—In, Se—Ge—Tl, Se—Te—As, Se—Ge—Tl—Sb, Se—Ge—Bi, Se—S (see Japanese Patent Publication No. 54-41902 and Japanese Patent No. 1004835), $TeO_x$ (Te dispersed in tellurium oxide as described in Japanese Patent Application Kokai No. 58-54338 and Japanese Patent No. 974257), $TeO_x + PbO_x$ (see Japanese Patent No. 974258), $TeO_x + VO_x$ (see Japanese Patent No. 974257), chalcogens, for example, Te and Se base materials such as Te—Tl, Te—Tl—Si, Se—Zn—Sb, Te—Se—Ga, and $TeN_x$, alloys capable of amorphous-crystal transformation such as Ge—Sn and Si—Sn, alloys capable of color change through crystal structure transformation such as Ag—Zn, Ag—Al—Cu, and CuAl, and alloys capable of grain size change such as In—Sb.

The recording layer may be formed by any desired dry coating technique including evaporation, sputtering, and ion plating. The recording layer generally has a thickness of from about 20 nm to about 1 μm.

The substrate 12 for use in the optical recording medium according to the present invention is generally formed of glass or a resinous material. Typical resins include acrylic resins, polycarbonate resins, epoxy resins, and olefinic resins such as polymethylpentene. Preferred among these resins are polycarbonate resins because of their durability, especially resistance to warpage.

The polycarbonate resins used herein may be aliphatic polycarbonates, aromatic-aliphatic polycarbonates and aromatic polycarbonates, with the aromatic polycarbonates being particularly preferred. Polycarbonates derived from bisphenols are preferred because of melting point, crystallinity and ease of handling. The most preferred is a bisphenol-A polycarbonate. The polycarbonate resin preferably has a number average molecular weight of from about 10,000 to 15,000.

The substrate 12 preferably has a refractive index of from about 1.55 to 1.59 at a wavelength of 830 nm. Since recording is generally carried out through the substrate, the transmittance of recording or reading-out light is preferably 86% or higher.

In general, the substrate is of disk shape although it may have another shape such as tape and drum. The substrate is of normal dimensions.

The surface 11 of such a disk-shaped substrate 12 on which the magnetic thin-film layer 18 is formed may be provided with a tracking channel. The channel has a depth of about $\lambda/8n$, especially from $\lambda/6n$ to $\lambda/12n$ wherein n is the refractive index of the substrate. The channel has a width of about 0.4 to 2.0 μm. The substrate may also be formed with a pit for addressing purpose.

Those portions of the magnetic thin-film layer which are located on the bottom of the channels constitute recording tracks where writing and reading light beams are preferably directed from the lower surface of the substrate. With this construction, the reading C/N ratio is improved and a control signal of a greater magnitude is available for tracking.

The protective layer 16 is usually disposed on the magnetic thin-film layer 18 as previously described. The protective layer 16 may be of the same composition as defined for the intermediate layer. Alternatively, the protective layer 16 may be formed from a variety of vitreous materials, such as $SiO$, $SiO_2$, $Al_2O_3$, $TiO_2$, $Si_3N_4$, AlN, TiN, SiC, ZnS and a mixture thereof. The protective layer 16 generally has a thickness of from about 300 to 3,000Å.

The optical recording medium of the present invention may further include an organic protective coating layer 20 which is formed on the magnetic thin-film layer 18 with or without the intervening protective layer 16.

The material of which the organic protective coating layer 20 is formed includes a variety of well-known organic materials. Preferably the organic protective coating layer 20 is a coating of a radiation-curable compound cured with radiation such as electron radiation and ultraviolet radiation.

Illustrative radiation-curable compounds include monomers, oligomers and polymers having contained or incorporated in their molecule groups capable of crosslinking or polymerizing upon exposure to radiation, for example, acrylic double bonds as given by acrylic and methacrylic acids having an unsaturated double bond capable of radical polymerization in response to an ionization energy and esters thereof, allyl double bonds as given by diallyl phthalate, and unsaturated bonds as given by maleic acid and maleic derivatives. The radiation-curable monomers used herein are those compounds having a molecular weight of less than 2,000 and the oligomers are those compounds having a molecular weight of 2,000 to 10,000.

The radiation-curable compounds having unsaturated double bonds which may be used as oligomers and monomers in the present invention include styrene, ethylacrylate, ethylene glycol diacrylate, ethylene glycol dimethacrylate, diethylene glycol diacrylate, diethylene glycol methacrylate, 1,6-hexaneglycol diacrylate, and 1,6hexaneglycol dimethacrylate. More preferred are pentaerythritol tetraacrylate (and methacrylate), pentaerythritol triacrylate (and methacrylate), trimethylolpropane triacrylate (and methacrylate), trimethylolpropane diacylate (and methacrylate), polyfunctional oligoester acrylates (e. g., Aronix M-7100, M-5400, M-5500, M-5700, M-6250, M-6500, M-8030, M-8060, M-8100, etc., available from Toa Synthetic K.K.), acryl modified products of urethane elastomers (e.g., Nippolane 4040 available from Nippon Polyurethane K.K.), and the derivatives thereof having a functional group such as COOH incorporated therein, acrylates and methacrylates of phenol ethylene oxide adducts, compounds having a pentaerythritol fused ring represented by the following general formula and having an acryl or methacryl group or epsilon-caprolactone-acryl group attached thereto:

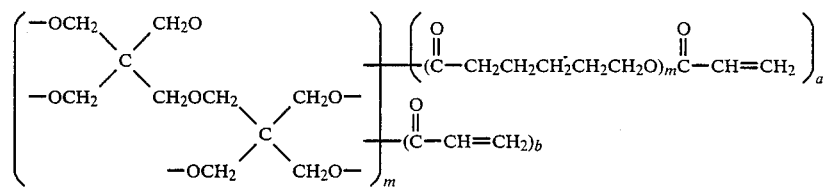

for example, compound wherein m=1, a=2, and b=4 (to be referred to as special pentaerythritol condensate A, hereinafter), compound wherein m=1, a=3, and b=3 (to be referred to as special pentaerythritol condensate B, hereinafter), compound wherein m=1, a=6, and b=0 (to be referred to as special pentaerythritol condensate C, hereinafter), and compound wherein m=2, a=6, and b=0 (to be referred to as special pentaerythritol condensate D, hereinafter), and special acrylates represented by the following general formulae:

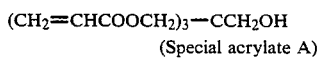
(Special acrylate A)   (1)

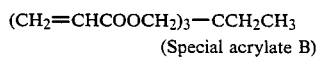
(Special acrylate B)   (2)

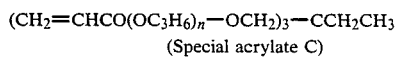
(Special acrylate C)   (3)

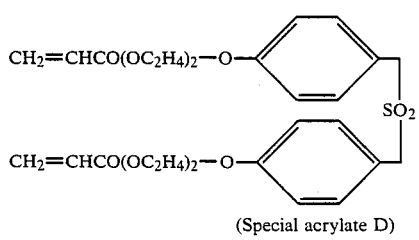
(Special acrylate D)   (4)

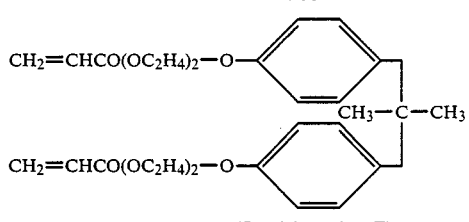
(Special acrylate E)   (5)

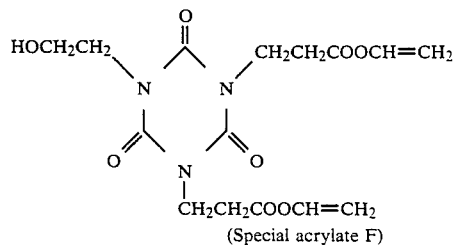
(Special acrylate F)   (6)

$$CH_3-(CH_2)_n-COOCH_2-\underset{\underset{CH_2COOCH=CH_2}{|}}{\overset{\overset{CH_2COOCH=CH_2}{|}}{C}}-CH_2OH$$
(n ≈ 16)    (Special acrylate G)   (7)

$$CH_2=CHCOO-(CH_2CH_2O)_4-COCH=CH_2$$
(Special acrylate H)   (8)

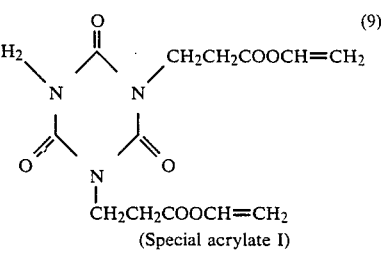
(Special acrylate I)   (9)

(Special acrylate J)   (10)
$$CH_3CH_2O-CO-(CH_2)_5-OCOCH=CH_2$$

$$A-(X-Y)_{\overline{n}}X-A$$   (11)
A: acrylic acid    X: polyhydric alcohol
Y: polybasic acid    (Special acrylate K)

-continued $$A+M-N)_{\overline{n}}M-A \quad (12)$$

A: acrylic acid  M: dihydric alcohol  N: dibasic acid
(Special acrylate L)

The radiation-curable oligomers include polyfunctional oligo-ester acrylates as represented by the following general formula:

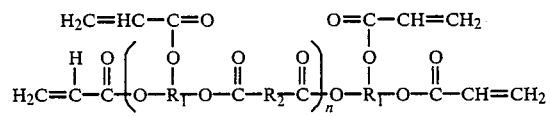

wherein $R_1$ and $R_2$ are alkyl and n is an integer, and acryl-modified urethane elastomers, and derivatives thereof having such a functional group as COOH incorporated therein.

Also employable are radiation-curable resins which are prepared by modifying thermoplastic resins to be radiation sensitive.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives.

The thermoplastic resins which can be modified into radiation-curable resins include vinyl chloride copolymers, saturated polyester resins, polyvinyl alcohol reins, epoxy resins, phenoxy resins, cellulosic derivatives, etc.

Other examples of the resins which can be modified to be radiation curable include polyfunctional polyester resins, polyether ester resins, polyvinyl pyrrolidone resins and derivatives (e.g., PVP-olefin copolymers), polyamide resins, polyimide resins, phenol resins, spiroacetal resins, and acrylic resins comprising as a polymerization component at least one acryl or methacryl ester having a hydroxyl group.

The organic protective coating layer 20 of radiation-cured compound has a thickness of about 0.1 to 30 μm, preferably about 1 to 10 μm. Films of less than 0.1 μm thick are difficult to produce as a uniform film, less moisture proof in a highly humid atmosphere, and thus insufficient to improve the durability of the magnetic thin-film layer 18. Films in excess of 30 μm thick are practically unacceptable because their shrinkage during curing causes the recording medium to be warped and cracks to occur in the protective layer.

The protective layer may be formed by coating an appropriate composition by any well-known coating methods such as spinner coating, gravure coating, spray coating, and dipping. The conditions under which the film is coated may be suitably chosen by taking into account the viscosity of the polymer component in the composition, the substrate surface state, and the intended coating thickness.

These radiation-curable resins may be cured by any of various well-known methods using electron or ultraviolet radiation.

For electron radiation curing, a radiation accelerator is preferably operated at an accelerating voltage of 100 to 750 kV, more preferably 150 to 300 kV to generate radiation having a sufficient penetrating power such that the object is exposed to a radiation dose of 0.5 to 20 megarad.

When curing is effected with ultraviolet radiation, a photo polymerization sensitizer may be added to the radiation curable compounds as mentioned above.

The photo polymerization sensitizers used herein may be selected from well-known sensitizers. Examples of such sensitizers include benzoins such as benzoin methyl ether, benzoin ethyl ether, α-methylbenzoin, α-chlorodeoxybenzoin, etc.; ketones such as benzophenone, acetophenone, bis(dialkylamino)benzophenones; quinones such as anthraquinone and phenanthraquinone; and sulfides such as benzyl sulfide, tetramethylthiuram monosulfide, etc. The photo polymerization sensitizers may be added in amounts of 0.1 to 10% by weight based on the resin solids.

For exposure to ultraviolet radiation there may be used UV lamps such as xenon discharge lamps and hydrogen discharge lamps.

The optical recording medium 10 of the present invention further includes a protective plate 24 disposed on the organic protective coating layer 20 through an adhesive layer 22. More particularly, the protective plate 24 is used when the medium is of single side recording type wherein recording and reproducing operations are carried out only from the lower surface 13 of the substrate 12 which is free of a magnetic thin-film layer.

The protective plate 24 may be of a resinous material. Since the resinous material of the protective plate need not be transparent, a variety of resins may be used, for example, thermoplastic resins such as polyethylene, polyvinyl chloride, polystyrene, polypropylene, polyvinyl alcohol, methacrylic resin, polyamide, polyvinylidene chloride, polycarbonate, polyacetal, and fluoro resin; and thermosetting resins such as phenol resin, urea resin, unsaturated polyester resin, polyurethane, alkyd resin, melamine resin, epoxy resin, and silicone resin.

It is also possible to form the protective plate 24 from an inorganic material such as glass and ceramics. The shape and dimensions of the protective plate 24 are approximately the same as the substrate 12.

The protective plate 24 is bonded to the organic protective coating layer 20 through the adhesive layer 22. The adhesive layer 22 may be of a hot-melt resin adhesive and has a thickness of about 1 to 100 μm.

Instead of the protective plate 24, two sets of substrate 12, intermediate layer 26, magnetic thin-film layer 18, protective layer 14/16, and organic protective coating layer 20 may be prepared and bonded with an adhesive layer such that the magnetic thin-film layers may be opposed to each other. This results in a double sided recording type medium wherein recording and reproducing operations can be carried out from the outside surfaces of both the substrates.

The lower surface 13 of the substrate 12 and the top surface of the protective plate 24 which is remote from the magnetic thin-film layer 18 are preferably covered with suitable protective coatings. Such coatings may be formed from the same material as previously described for the organic protective coating layer 20.

The optical recording medium of the present invention having an intermediate layer of a specific composition formed between a substrate and a recording layer is satisfactorily durable and resistant to corrosion. It can reproduce an output with a high C/N ratio and a minimized error rate.

EXAMPLES

In order that those skilled in the art will better understand the practice of the present invention, examples of the present invention are given below by way of illustration and not by way of limitation.

Example 1

An optical recording disk having the structure as shown in FIG. 1 was prepared by molding a disk-shaped substrate 12 from a bisphenol-A polycarbonate of optical disk grade to a diameter of 13 cm and a thickness of 1.2 mm. A sintered mixture of $La_2O_3$, $SiO_2$, and $Si_3N_4$ as a target was sputtered on the substrate to form an intermediate layer 26 having a thickness of 800Å. The composition of the intermediate layer reported in Table 2 is calculated by the data of chemical analysis on the basis of the stoichiometric composition of the oxides and nitrides indicated in the table heading. The refractive index of the intermediate layer at 800 nm is also reported in Table 2. The refractive index was changed by a choice of source composition and sputtering conditions including gas pressure and gas composition.

A magnetic thin-film layer 18 of Tb 21 at %-Fe 68 at %-Co 7 at %-Cr 4 at % alloy was formed on the intermediate layer 26 by sputtering to a thickness of 800Å. The target used in sputtering was an iron (Fe) target having Tb, Co and Cr chips rested thereon.

A protective layer 16 of borosilicate glass was formed on the magnetic thin-film layer 18 to a thickness of 1,000Å.

The protective layer 16 was coated with a radiation-curable coating composition by spinner coating to form an organic protective coating layer 20. The coating composition contained 100 parts by weight of a multifunctional oligo-ester acrylate and 5 parts by weight of a light sensitizer. The coating of the composition was exposed to UV for 15 seconds into a cured film.

In this way, a series of samples designated Nos. 101 to 107 were prepared as shown in Table 2.

Example 2

A disk sample No. 108 was prepared by repeating the procedure of Example 1 except that the target used to form the intermediate layer by sputtering was a mixture of $CeO_2$, $SiO_2$, and $Si_3N_4$.

Example 3

A disk sample No. 109 was prepared by repeating the procedure of Example 1 except that the target used to form the intermediate layer by sputtering was a mixture of the oxide of Misch metal (MM) having the composition shown in Table 1, $SiO_2$, and $Si_3N_4$.

Comparative Example 1

A film consisting of $SiO_2$ and/or $Si_3N_4$ was formed as the intermediate layer 26 by reactive sputtering to a thickness of 800Å. The remaining structure was the same as Example 1. The resulting samples are designated sample Nos. 110 to 112.

Comparative Example 2

Disk sample No. 113 was prepared by repeating the procedure of Example 1 except that the intermediate layer was omitted.

These samples were measured for the following properties.

(1) Initial C/N

The initial C/N (carrier-to-noise ratio) of a sample expressed in dB was measured under the following conditions.

Rotating speed: 4 m/sec.
Carrier frequency: 1.0 MHz
Resolution: 30 KHz
Recording power: 3–6 mW at 830 nm
Reproducing power: 1 mW at 830 nm (2) Durability After a sample was kept for 1,000 hours at 60° C. and RH, it was observed for a change of bit error rate, film spalling, and a change of appearance. The bit error rate was measured by recording an NRZ signal under the conditions mentioned in (1). The initial bit error rate was $3 \times 10^{-6}$.

The results are shown in Table 2.

TABLE 2

| Sample No. | Intermediate Layer Composition (wt %) $La_2O_3$ | $SiO_2$ | $Si_3N_4$ | Refractive index | Initial C/N (dB) | Durability Bit error rate ($\times 10^{-6}$) | Appearance change |
|---|---|---|---|---|---|---|---|
| 101 (Example 1) | 20 | 20 | 60 | 2.4 | 56 | 3.0 | |
| 102 (Example 1) | 30 | 20 | 50 | 2.2 | 55 | 3.0 | |
| 103 (Example 1) | 40 | 30 | 30 | 2.1 | 55 | 3.0 | |
| 104 (Example 1) | 10 | 30 | 60 | 2.3 | 56 | 4.0 | |
| 105 (Example 1) | 20 | 50 | 30 | 2.0 | 54 | 3.0 | |
| 106 (Example 1) | 10 | 30 | 60 | 2.9 | 52 | 4.0 | |
| 107 (Example 1) | 20 | 60 | 20 | 1.8 | 52 | 3.0 | |
| 108 (Example 2) | $CeO_2$ 30 | 10 | 60 | 2.3 | 54 | 4.0 | |
| 109 (Example 3) | MM 30 | 40 | 30 | 2.0 | 54 | 4.0 | |
| 110 (Comparative Example 1) | 0 | 50 | 50 | 1.9 | 52 | 10 | some spalling |
| 111 (Comparative Example 1) | 0 | 0 | 100 | 2.2 | 52 | 10 | spalling pinholes |
| 112 (Comparative Example 1) | 0 | 100 | 0 | 1.6 | 47 | 20 | spalling pinholes |
| 113 (Comparative Example 2) | — | — | — | — | 47 | — | many pinholes |

Example 4

An optical recording disk having the structure as shown in FIG. 2 was prepared by molding a disk-shaped substrate 12 from a bisphenol-A polycarbonate of optical disk grade to a diameter of 13 cm and a thickness of 1.2 mm. A protective layer 14 of a vitreous material having the composition shown in Table 3 was formed on the substrate by sputtering to a thickness of 1,000Å. Then a sintered mixture of $La_2O_3$, $SiO_2$, and $Si_3N_4$ as a target was sputtered on the protective layer 14 to form an intermediate layer 26 having a thickness of 800Å. The composition of the intermediate layer reported in Table 3 is calculated by the data of chemical analysis on the basis of the stoichiometric composition of the oxides and nitrides indicated in the table heading. The refractive index of the intermediate layer at 800 nm is also reported in Table 3. The refractive index was changed by a choice of source composition and sputtering conditions including gas pressure and gas composition.

A magnetic thin-film layer 18 of Tb 21 at %-Fe 68 at %-Co 7 at %-Cr 4 at % alloy was formed on the intermediate layer 26 by sputtering to a thickness of 800Å. The target used in sputtering was an iron (Fe) target having Tb, Co and Cr chips rested thereon.

A protective layer 16 of a vitreous material was formed on the magnetic thin-film layer 18. The composition and thickness of the upper protective layer 16 are the same as those of the lower protective layer 14 for each sample.

The protective layer 16 was coated with a radiation-curable coating composition by spinner coating to form an organic protective coating layer 20. The coating composition contained 100 parts by weight of a multi-functional oligo-ester acrylate and 5 parts by weight of a light sensitizer. The coating of the composition was exposed to UV for 15 seconds into a cured film.

In this way, a series of samples designated Nos. 201 to 207 were prepared as shown in Table 3.

Example 5

A disk sample No. 208 was prepared by repeating the procedure of Example 4 except that the target used to form the intermediate layer by sputtering was a mixture of $CeO_2$, $SiO_2$, and $Si_3N_4$.

Example 6

A disk sample No. 209 was prepared by repeating the procedure of Example 4 except that the target used to form the intermediate layer by sputtering was a mixture of the oxide of Misch metal (MM having the composition shown in Table 3, $SiO_2$, and $Si_3N_4$.

Comparative Example 4

A film consisting of $SiO_2$ and/or $Si_3N_4$ was formed as the intermediate layer 26 by reactive sputtering to a thickness of 800Å. The remaining structure was the same as Example 4. The resulting samples are designated sample Nos. 210 and 211.

Comparative Example 5

Disk sample No. 212 was prepared by repeating the procedure of Example 4 except that the intermediate layer was omitted.

These samples were measured for the following properties.

(1) Initial C/N

The initial C/N (carrier-to-noise ratio) of a sample expressed in dB was measured under the following conditions.

Rotating speed: 4 m/sec.
Carrier frequency: 1.0 MHz
Resolution: 30 KHz
Recording power: 3–6 mW at 830 nm
Reproducing power: 1 mW at 830 nm (2) Durability A thermal cycling test was carried out on a sample according to IEC-2-38 over a temperature range of from $-10°$ C. to $+65°$ C. at a relative humidity of 93%. This accelerated test was continued until the bit error rate reached twice the initial. The durability of the sample is expressed by the duration of the test continued. Under the conditions, spalling and cracking in the film largely contributed to an increase of bit error rate.

After a sample was kept for 1,000 hours at 60° C. and 90% RH, it was observed for a change of bit error rate, film spalling, and a change of appearance.

The bit error rate was measured by recording an NRZ signal under the above-mentioned conditions.

(3) Corrosion resistance

A high-temperature, high-humidity aging test was carried out. That is, a sample was stored at 70° C. and 90% RH. This accelerated test was continued until the bit error rate reached twice the initial. The corrosion resistance of the sample is expressed by the duration of the test continued. Under the conditions, occurrence of pinholes largely contributed to an increase of bit error rate.

The results are shown in Table 3.

TABLE 3

| Sample No. | Protective Layers 14, 16 Composition (wt %) | | | | | | | | | Intermediate Layer Composition (wt %) | | | Refractive index | C/N (dB) | Durability (hr.) | Corrosion resistance (hr.) | Change of appearance |
|---|---|---|---|---|---|---|---|---|---|---|---|---|---|---|---|---|---|
| | SiO$_2$ | Al$_2$O$_3$ | B$_2$O$_3$ | Na$_2$O | K$_2$O | BaO | CaO | MgO | ZnO | La$_2$O$_3$ | SiO$_2$ | Si$_3$N$_4$ | | | | | |
| 201 (Example 4) | 53 | 42 | — | 3.0 | 2.0 | — | — | — | — | 20 | 20 | 60 | 2.4 | 56 | >800 | >1000 | |
| 202 (Example 4) | 48 | — | 47 | 3.0 | 2.0 | — | — | — | — | 30 | 20 | 50 | 2.2 | 55 | >800 | >1000 | |
| 203 (Example 4) | 55 | — | 30 | 2.0 | 1.0 | 8.0 | — | 4.0 | — | 40 | 30 | 30 | 2.1 | 55 | >800 | >1000 | |
| 204 (Example 4) | 53 | 25 | 17 | 3.0 | 2.0 | — | — | — | — | 10 | 30 | 60 | 2.3 | 56 | >800 | >1000 | |
| 205 (Example 4) | 48 | 6 | 12 | 1.0 | 1.0 | 20.0 | 10.0 | — | 2.0 | 20 | 50 | 30 | 2.0 | 54 | >800 | >1000 | |
| 206 (Example 4) | 45 | — | 20 | 1.0 | 0.5 | 22.0 | 11.5 | — | — | 10 | 30 | 60 | 2.8 | 52 | >800 | >1000 | |
| 207 (Example 4) | 53 | 25 | 17 | 3.0 | 2.0 | — | — | — | — | 20 | 60 | 20 | 1.8 | 51 | >800 | >1000 | |
| 208 (Example 5) | 54 | 7 | 13 | 0.5 | 0.5 | 21.0 | — | — | 4.0 | 30CeO$_2$ | 10 | 60 | 2.3 | 54 | >800 | >1000 | |
| 209 (Example 6) | 48 | 6 | 12 | 1.0 | 1.0 | 20.0 | 10.0 | — | 2.0 | 30 MM | 40 | 30 | 2.0 | 53 | >800 | >1000 | |
| 210 (Comparative Example 4) | 48 | — | 19 | 9.0 | 6.0 | 5.0 | 9.0 | 4.0 | — | — | 50 | 50 | 1.9 | 52 | 800 | 700 | some spalling |
| 211 (Comparative Example 4) | 48 | 6 | 12 | 1.0 | 1.0 | 20.0 | 12.0 | — | — | — | 100 | — | 1.6 | 48 | 600 | 1000 | some spalling |
| 212 (Comparative Example 5) | 48 | — | 19 | 9.0 | 6.0 | 5.0 | 9.0 | 4.0 | — | — | — | — | — | 47 | 800 | 600 | some spalling |
| 105 (Example 1) | — | — | — | — | — | — | — | — | — | 20 | 50 | 30 | 2.0 | 54 | 600 | 600 | spalling |

The results of Examples 1 to 6 show the effectiveness of the present invention.

Similar results were obtained with phase conversion type recording layers of Te—Ge, TeO$_x$, and Te—Se.

Obviously, numerous modifications and variations of the present invention are possible in light of the above teachings. It is therefore to be understood that within the scope of the appended claims, the invention may be practiced otherwise than as specifically described herein.

We claim:

1. A magneto-optical recording medium comprising
   (i) a substrate,
   (ii) a recording layer on the substrate, and
   (iii) an intermediate layer between the substrate and the recording layer having a thickness of from about 300 to about 3,000Å, said intermediate layer comprising a mixture of a rare earth element oxide, silicon oxide, and silicon nitride, wherein said rare earth element oxide is present in the intermediate layer in a weight ratio of rare earth element oxide to the total of silicon oxide, silicon nitride, and rare earth element oxide of from about 1:30 to about 1:2, and wherein said silicon oxide and silicon nitride are present at a molar ration of from about 50:50 to about 90:10, calculated as SiO$_2$ and Si$_3$N$_4$.

2. The magneto-optical medium of claim 2, wherein the rare earth element is La, Ce, or a mixture of La and Ce.

3. The magneto-optical medium of claim 2, wherein said intermediate layer has a refractive index of from about 1.8 to about 3.0 at a wavelength of 800 nm.

4. The magneto-optical medium of claim 2, which further comprises a protective layer disposed either between the substrate and the intermediate layer or on the side of the recording layer opposite said intermediate layer.

5. The magneto-optical medium of claim 2, which further comprises two protective layers wherein one protective layer is disposed between the substrate and the intermediate layer and the other protective layer is disposed on the recording layer.

6. The magneto-optical medium of claim 1, wherein the atomic ratio of O/N ranges from about 0.2:1 to about 3:1.

7. The magneto-optical medium of claim 1, wherein said intermediate layer contains less than about 10 atom percent of yttrium oxide or erbium oxide, the atom percent, calculated as metal and based on the primary rare earth element.

8. The magneto-optical medium of claim 1, wherein said intermediate layer contains Fe in an amount of less than about 10 atom percent, and Mg, Ca, Sr, Ba, and Al in a total amount of less than about 10 atom percent.

9. The magneto-optical medium of claim 1, wherein said intermediate layer has a refractive index of from about 2.0 to about 2.5 at a wavelength of 800μm.

10. The magneto-optical medium of claim 1, wherein said rare earth element oxide is partially or entirely replaced by the oxide of a pyrophoric alloy.

11. The magneto-optical medium of claim 10, wherein said pyrophoric alloy is Auer metal, Huber metal, Misch metal, or Welsbach metal.

12. The magneto-optical medium of claim 1, wherein said intermediate layer has a thickness of from about 500 to about 2,000Å.

* * * * *